United States Patent [19]

Otomo

[11] Patent Number: 5,668,716
[45] Date of Patent: Sep. 16, 1997

[54] CONTROLLER FOR TWO-WAY SERIAL TRANSMISSION AND ADAPTER FOR SERIAL PORT

[75] Inventor: Masahiko Otomo, Kanagawa-ken, Japan

[73] Assignee: Nikon Corporation, Tokyo, Japan

[21] Appl. No.: 399,470

[22] Filed: Mar. 7, 1995

[30] Foreign Application Priority Data

Mar. 8, 1994 [JP] Japan ................................. 6-036249

[51] Int. Cl.⁶ .......................... G06F 19/00; G06F 13/20
[52] U.S. Cl. .................................. 364/131; 364/DIG. 1; 364/238.6; 395/309
[58] Field of Search .................... 340/825.07, 825.08, 340/825.05, 870.11, 825; 395/280, 285, 286, 309, 310, 891, 500; 370/77; 364/492, 131–136, DIG. 1 MS File, DIG. 2 MS File; 359/368, 382, 383

[56] References Cited

U.S. PATENT DOCUMENTS

| | | | |
|---|---|---|---|
| 4,814,761 | 3/1989 | Takahashi et al. | 340/825.05 |
| 5,134,702 | 7/1992 | Charych et al. | 395/500 |
| 5,159,684 | 10/1992 | Kroll et al. | 395/500 |
| 5,381,529 | 1/1995 | Matsushima | 395/309 |
| 5,436,897 | 7/1995 | Cook | 370/77 |
| 5,440,301 | 8/1995 | Evans | 340/870.11 |
| 5,457,786 | 10/1995 | Roush | 395/280 |
| 5,459,453 | 10/1995 | Minerd et al. | 340/825 |
| 5,485,397 | 1/1996 | Yamazato et al. | 364/492 |

*Primary Examiner*—Joseph Ruggiero
*Attorney, Agent, or Firm*—Shapiro and Shapiro

[57] ABSTRACT

A controller performs two-way serial communications between a plurality of devices at one time through a reduced number of data communication lines by use of a serial communication line and a serial port adapter connected to a CPU and an external device. The controller includes the CPU, a serial communication device constituting the adapter, and a discriminator. The serial communication device includes an interface having output and input ports, an output buffer circuit, an input buffer circuit and a data I/O terminal for transferring data. The output port is connected via the output buffer circuit to the data I/O terminal. The data I/O terminal is connected also to the input port via the input buffer circuit. A single two-way serial data communication line is thus formed. The discriminator is provided in the CPU when a specified identification code is inputted to the input port of the serial communication device, data can be received.

21 Claims, 6 Drawing Sheets

CONTROLLER FOR TWO-WAY SERIAL TRANSMISSION AND ADAPTER FOR SERIAL PORT

BACKGROUND OF THE INVENTION

1. Field of the Invention

The present invention relates to a communication network of a microcomputer-assisted controller including a serial communication device.

2. Related Background Art

Nowadays, measuring and observing devices and many other controllers perform a variety of control operations based on microcomputers. Operations by the user are simplified and facilitated by automatically adjusting respective units of the devices when effecting the measurements, observations and control. In a complicated device, a simple one-chip microcomputer is incorporated into every unit of the device, and each unit is automatically adjusted. At the same time, each of the microcomputers is controlled by a personal computer, or alternatively, as increasingly practiced, the device is operated by receiving and transferring the data between the microcomputers.

Figure 1:
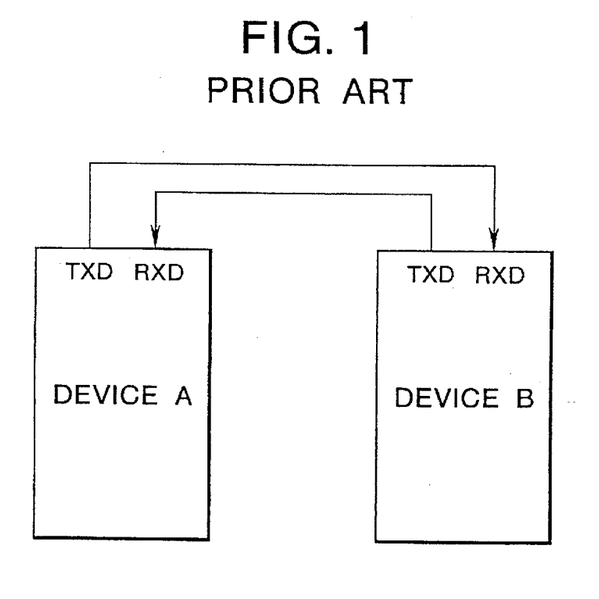
FIG. 1 is a circuit block diagram showing conventional connections of two controllers.

As explained above, in the controller having the units each incorporating a central processing unit (CPU) known as a microcomputer, when receiving and the transferring the data from and to other units, in the great majority cases, serial communications are conducted by use of an RS232C port. In this type of serial communications, as illustrated in FIG. 1, there is a one-to-one correspondence between the input and output terminals of two devices A, B for receiving and transferring the data. More particularly, an RXD terminal serving as an input terminal of one device is connected to a TXD terminal serving as an output terminal of the other device. A plurality of sets of the data input and output terminals are thus needed for connecting a single device to a plurality of devices.

Figure 2:
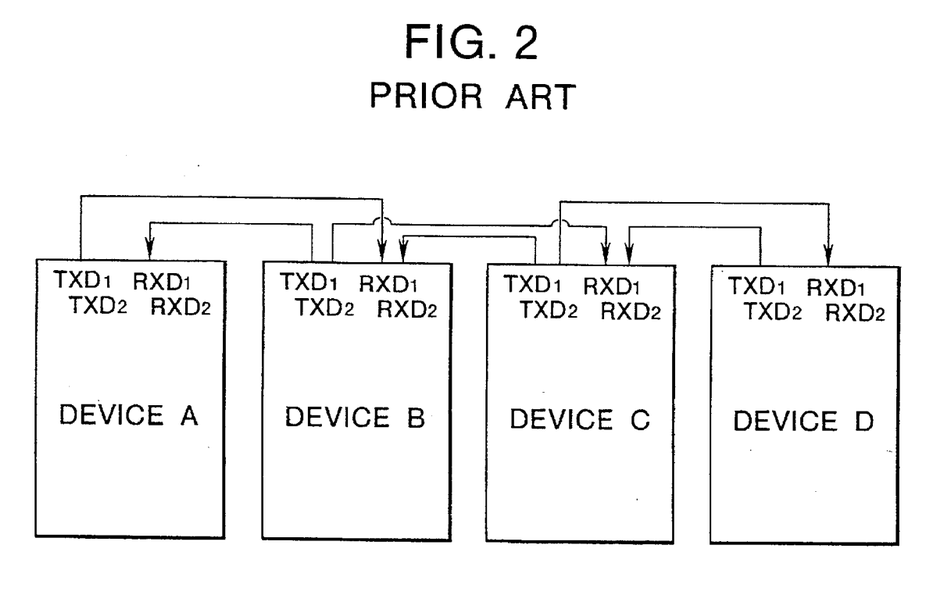
FIG. 2 is a circuit block diagram showing conventional connections of three or more controllers.

In the arrangement shown in FIG. 2, for example, an RXD1 terminal as a data input terminal of the first device A is connected to a TXD1 terminal as a first data output terminal of the second device B. At the same time, the TXD1 terminal defined as a data output terminal of the first device A is connected to the RXD1 terminal defined as a first data input terminal of the second device B. This arrangement allows transferring and receiving the data between the first and second devices A, B. Further, the data are received and transferred between the second device and a third device C by connecting an RXD2 terminal defined as a second data input terminal of the second device B and the TXD1 terminal defined as a data output terminal of the third device C, and connecting the TXD2 terminal defined as a second data output terminal of the second device B and the RXD1 terminal defined as a data input terminal of the third device C. In this way, the pairs of data input and output terminals are connected in order to establish communications.

On the other hand, parallel communications through a GPIB (General Purpose Interface Bus) are conducted between devices in some cases. The parallel communications involve the use of a plurality of control lines in addition to a data bus. Then, the devices exclusive of two specified devices are electrically disconnected from the data bus, and the data are transferred between these two specified devices.

Nowadays, there are increasingly demands for improving the function of whole systems and making the working mode changeable according to the application by adding an optional device to the system constructed of the plurality of devices connected to each other. It is also required that the operation be automated by having a built-in CPU and that the data be transferred to and received from other devices of the system. Hence, the added optional device also has to incorporate a serial communications function.

The serial communications enable the data to be transferred between the devices simply by use of the RS232C interface. It is, however, required that the respective devices be connected in the one-to-one correspondence. In the case of adding a device to an existing system, the programs of the CPUs incorporated into the devices constituting the existing system are changed, and the conventional device and the device to be added have to be individually connected. This makes it difficult to add a new device having the built-in CPU to the system.

In a system using parallel communications, an optional device is connected to the data bus as well as to the control bus, and it is therefore easy to expand the system by adding devices. However, a control circuit dedicated to the parallel communications is needed. The majority of boards, each known as a one-chip microcomputer, generally employed at present do not incorporate a parallel communications function. Accordingly, in order to assemble the system, the device to which a dedicated I/O port is added beforehand has to be manufactured, so that manufacturing the device and its respective units is complicated and expensive.

SUMMARY OF THE INVENTION

It is a primary object of the present invention to provide a controller capable of performing two-way serial communications between a plurality of devices at one time through a reduced number of data communication lines by use of a serial communication line.

It is another object of the present invention to provide a serial port oriented adapter connected between a CPU and an external device to effect the two-way serial communications.

The controller according to the present invention may include a central processing unit (CPU), a serial communication device and a discriminator. The serial communication device includes an interface having an output port for outputting data from the CPU and an input port for inputting the data to the CPU, an output buffer circuit, an input buffer circuit and a data I/O terminal for transferring the data to and from the outside. The output port is connected to the data I/O terminal via the output buffer circuit. The data I/O terminal is connected also to the input port via the input buffer circuit, with the result that a single two-way serial data communication line is thus formed. The discriminator is provided in the CPU and when a specified identification code is inputted to the input port of the serial communication device, permits the receipt of data.

In the present invention, a multiplicity of devices are freely connectable to or separable from the communication line connected to the data I/O terminal. The single communication line is employed as a two-way serial data communication line, thereby making it possible to freely receive and transfer the data. This therefore permits receiving and transmitting the data of, for example, a microscope or the like. It is, however, useful to employ the controller for a device having a comparatively small quantity of data.

In a modified example of the controller according to the present invention, the serial communication device further includes a data input terminal for receiving data from the outside. The data input terminal is connected to the input port via the input buffer circuit. A one-way serial data communication line is thereby formed in addition to the above single two-way serial data communication line. According to this modified example, it is feasible to make connections to other controllers through the data I/O terminal and, at the same time, to make a connection to a computer having conventional transmitting and receiving ports. In a preferred mode, the two-way serial data communication line is connected to the receiving port, and the one-way serial data communication is connected to the transmitting port of the conventional pair. Accordingly, two-way serial communications between controllers of the invention can be performed via the single two-way line, and serial communications with the conventional devices can also be carried out.

Further, an adapter for a serial port according to the present invention includes an output buffer circuit and an input buffer circuit. The output buffer circuit has a data input terminal and a control signal input terminal that are respectively connected to a CPU and a data output terminal connected to an outside data I/O terminal connected to an external device. The output buffer circuit has a signal line for transmitting a signal inputted to a data input terminal to the outside data I/O terminal in response to a data output control signal inputted to the control signal input terminal. The input buffer circuit has a signal line, provided between the outside data I/O terminal and the data output terminal, for transmitting a signal inputted to the outside data I/O terminal to the data output terminal.

In a modified example of the adapter according to the present invention, the input buffer circuit is further provided with an outside data input terminal connected to an external device and a signal line for transmitting a signal inputted to the outside data input terminal to the data output terminal.

DESCRIPTION OF THE PREFERRED EMBODIMENTS

Embodiments of a controller according to the present invention will hereinafter be discussed as applied to a controller for driving a variety of operating devices of a microscope.

Figure 3:
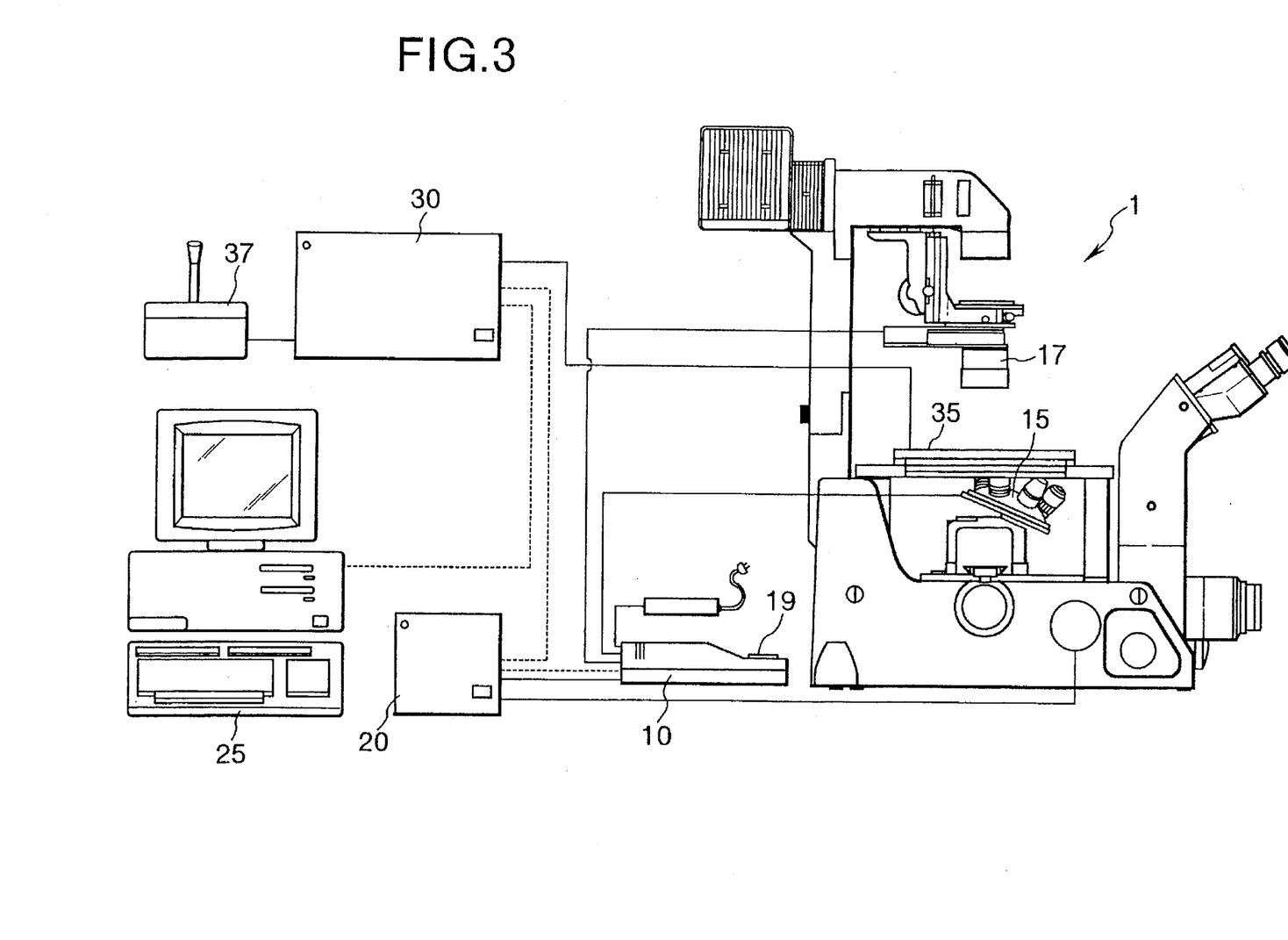
FIG. 3 is a schematic block diagram illustrating a microscope system in an embodiment of the present invention.

A microscope system 1 illustrated in FIG. 3 includes first, second and third controllers 10, 20, 30. The three controllers each incorporating a CPU individually control driving of a part of the microscope and, at the same time, transfer data and control codes to each other. The first controller 10 is a motor drive controller for controlling driving of a revolver 15 of an objective lens and a turret condenser 17 on the basis of an input to a keyboard 19. The second controller 20 is a focus controller for controlling a focus device 13 of the microscope automatically or on the basis of the input to the keyboard 19. The third controller 30 is a stage controller for controlling a movement of a stage 35 of the microscope on the basis of an operation of an operation unit 37 such as a joy stick.

Figure 4:
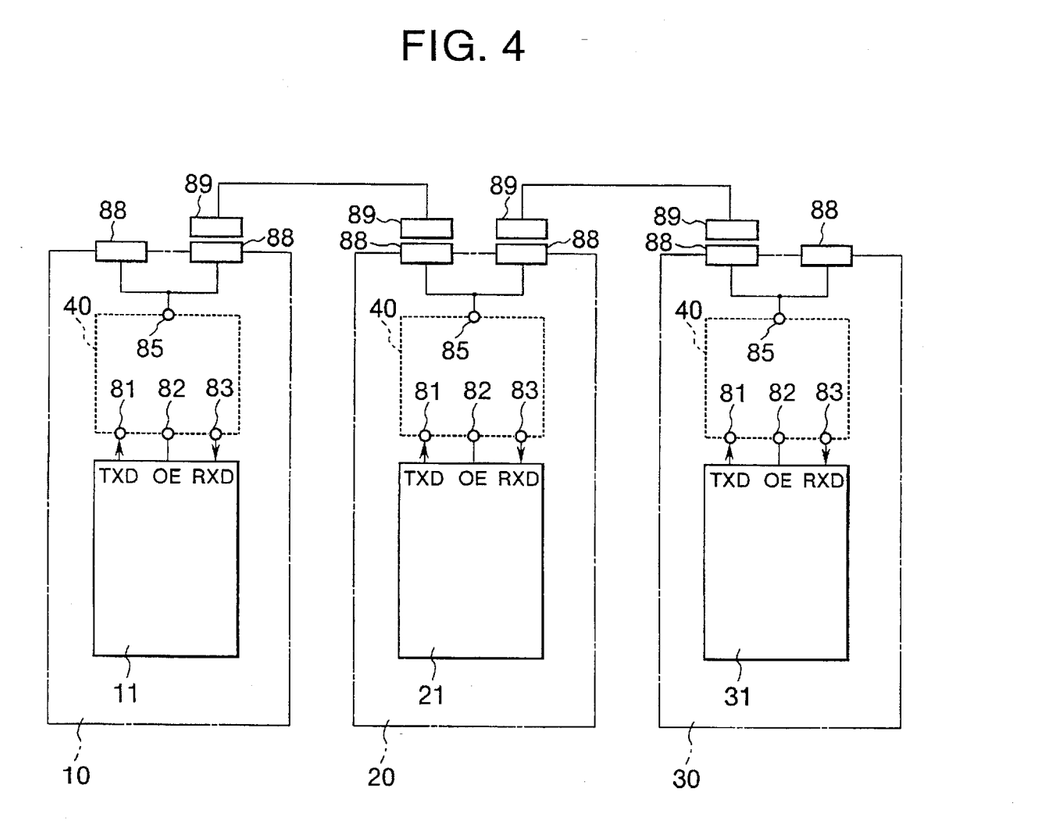
FIG. 4 is a block diagram illustrating the system in which the three controllers are connected.

As illustrated in FIG. 4, the first, second and third controllers 10, 20, 30 have CPU boards 11, 21, 31, each mounted with a CPU (not shown) and incorporate communication mechanisms based on RS232C standards. In accordance with this embodiment, the data of the control codes or the like can be transferred via the first controller 10 defined as the motor-drive controller to the second and third controllers 20, 30. These controllers 10, 20, 30 are different from each other in terms of their programs and control functions, but each is capable of serial communications in accordance with programs stored in read-only memories (not shown) provided on the CPU boards 11 21, 31. A respective two-way conversion adapter 40 functioning as a serial port adapter is connected to each of the CPU boards 11, 21, 31. A single two-way data communication line is formed through these adapters. For connecting this communication line, each of the controllers 10, 20, 30 is provided with two connectors 88 which are connected to each other as shown.

Each of the CPU boards 11, 21, 31 involves the use of a transmitting/receiving interface based on, e.g., the RS232C standards. Connected to each two-way conversion adaptor 40 are a corresponding data output terminal (TXD terminal) defined as a serial data output port of the interface, a data input terminal (RXD terminal) defined as a serial data input port and a terminal (OE terminal) from which an output enable signal is outputted. The output enable signal serves as a control signal indicating an output of the serial data. As a result, all the controllers 10, 20, 30 are connected to each other by a single communication line.

Figure 5:
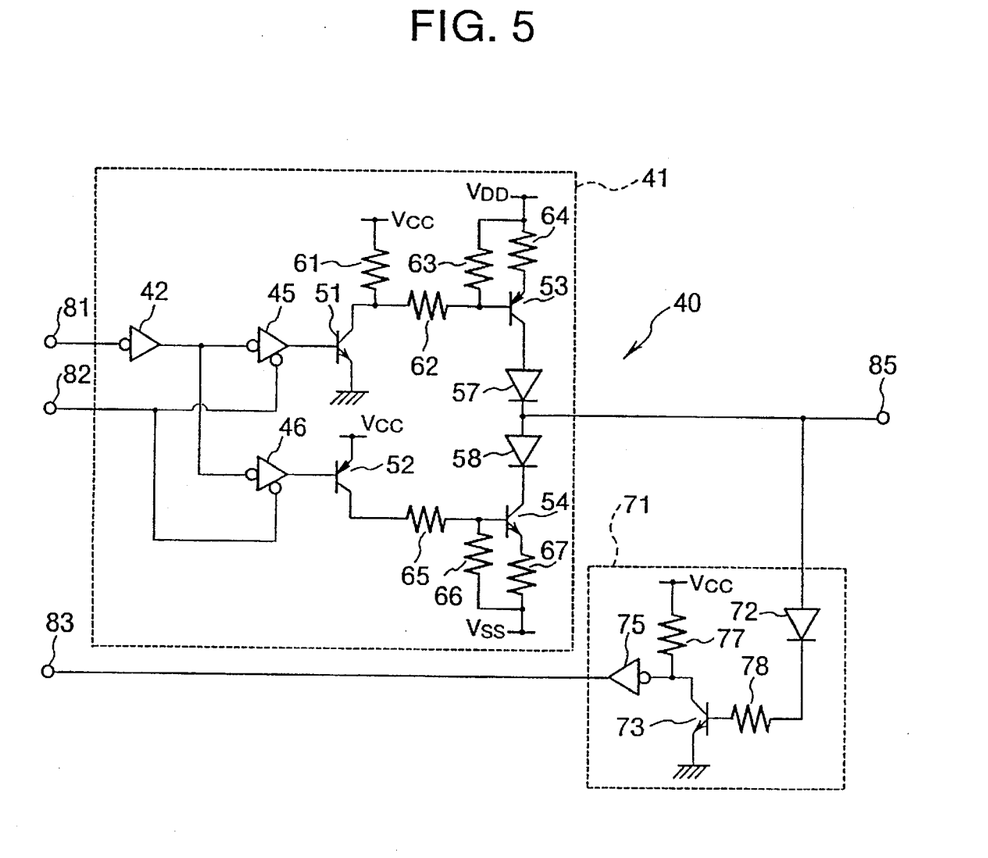
FIG. 5 is a circuit diagram illustrating an adapter for a two-way conversion.

Each of the two-way conversion adapters 40 is, as depicted in FIG. 5, composed of an output buffer circuit 41 and an input buffer circuit 71. The output buffer circuit 41 includes an inverter 42 connected to a data input terminal 81, which is connected to the TXD terminal of the corresponding one of the CPU boards 11, 21, 31 and three-state buffers 45, 46 each connected to an output of the inverter 42. The output buffer circuit 41 further includes an NPN transistor 51 having a base connected to an output of the three-state buffer 45 and a PNP transistor 52 having a base connected to an output of the three-state buffer 46. Control terminals of the three-state buffers 45, 46 are connected via a control signal input terminal 82 to the OE terminal of the CPU board. An emitter of the transistor 51 is grounded, while a collector thereof is connected via a resistor 61 to a +5 volt power supply VCC and connected to a base of a PNP transistor 53 through a resistor 62.

An emitter of the transistor 52 is connected to the power supply VCC, a collector thereof is connected via a resistor 65 to a base of the NPN transistor 54. A resistor 64, the transistor 53, diodes 57, 58, the transistor 54 and a resistor 67 are connected in series between a +12 volt power supply VDD and a −12 volt power supply VSS. A data I/O terminal 85 is connected to a midpoint between the diodes 57 and 58. Note that resistors 63, 66 are used for clamping.

The following is a description of how the output buffer circuit 41 operates. When the output enable signal is inputted to the input terminal 82, the three-state buffers 45, 46 are brought into a conductive state. When the data are outputted from the output terminal of the corresponding one of CPU boards 11, 21, 31, the data inputted from the data input terminal 81 passes through the three-state buffers 45, 46. When this item of data assumes an H level, the transistors 51, 53 are made conductive, and an electric potential of the power supply VDD is outputted to the data Z/O terminal 85. When the data inputted to the data I/O terminal 81 assumes an L level, the transistor 51 is brought into a cut-off state, and the transistors 52, 54 become conductive. Hence, a signal of an electric potential (−12 volt) of the power supply VSS is outputted from the terminal 85 to a data bus. When the input terminal 82 comes to assume the H level, and there is developed a state where the output enable signal is not inputted the three-state buffers 45, 46 are put into a non-conductive state. Thus, the transistors 51, 52 are also brought into the non-conductive state, with the result that the transistors 53, 54 are set in a high-impedance state.

The input buffer circuit 71 serves to connect the data I/O terminal 85 to a base of the NPN transistor 73 through the diode 72 and the resistor 78. An emitter of this transistor 73 is grounded, while a collector thereof is connected via a resistor 77 to the power supply VCC and, at the same time, connected via an inverter 75 to the data output terminal 83.

Accordingly, this input buffer circuit 71, when the data inputted to the I/O terminal 85 is at the H level, operates to make the transistor 73 conductive and to output the H-level signal to the output terminal 83 by setting the input terminal of the inverter 75 at the L level. Also, the input buffer circuit 71, when the data inputted to the I/O terminal 85 is at the L level, operates to make the transistor 73 non-conductive and to set the output terminal 83 at the L level. That is, the input buffer circuit 71 increases an input impedance as seen from the I/O terminal 85 while transferring the signal of the I/O terminal 85 to the data output terminal 83.

In this way, the two-way conversion adapter 40 functioning as a serial port adapter transfers the signal of the data input terminal 81 to the data I/O terminal 85 and also transfers the signal of the data I/O terminal 85 to the data output terminal 83. As illustrated in FIG. 4, the data input terminal 81 is connected to the TXD terminal of the corresponding one of the CPU boards 11, 21, 31, the control signal input terminal 82 is connected to the OE terminal, and the data output terminal 83 is connected to the RXD terminal. With this arrangement, the signal outputted from the data output terminal of the CPU board can be transmitted to the data I/O terminal 85, and the signal inputted to the data I/O terminal 85 can be transmitted to the data input terminal of the CPU board. It is therefore possible to connect the serial output and input ports of the CPU boards en bloc through the single common communication line.

The CPUs mounted on the respective CPU boards 11, 21, 31 store individual device numbers in the form of identification codes. Further, each CPU incorporates such a program that when this identification code is inputted from the input port, an item of data having a predetermined length subsequent to the identification code is inputted by the CPU. Each CPU inputs the data of the communication line only when recognizing a self-identification code. Even when a multiplicity of devices are connected to the communication line, each device outputs data by use of the output enable signal in combination with the identification code for specifying another device as a destination for transmission, and this item of data is transmitted to the communication line from the data I/O terminal 85. The data are sent to all the controllers connected to the communication line. In the specified device, when this identification code is inputted to the input port via the input buffer circuit 71, the CPU reads the data subsequent to the identification code. Thus, only the specified device is allowed to receive the data.

As described above, each of the controllers 10, 20, 30 is provided with a two-way conversion adapter 40 and the discriminator including the program for discriminating the self-identification code. Hence, it is possible to freely add a new controller to the single two-way serial data communication line of the system or to remove an unnecessary controller. For example, as illustrated in FIG. 3, a personal computer 25 can be further added readily.

Figure 6:
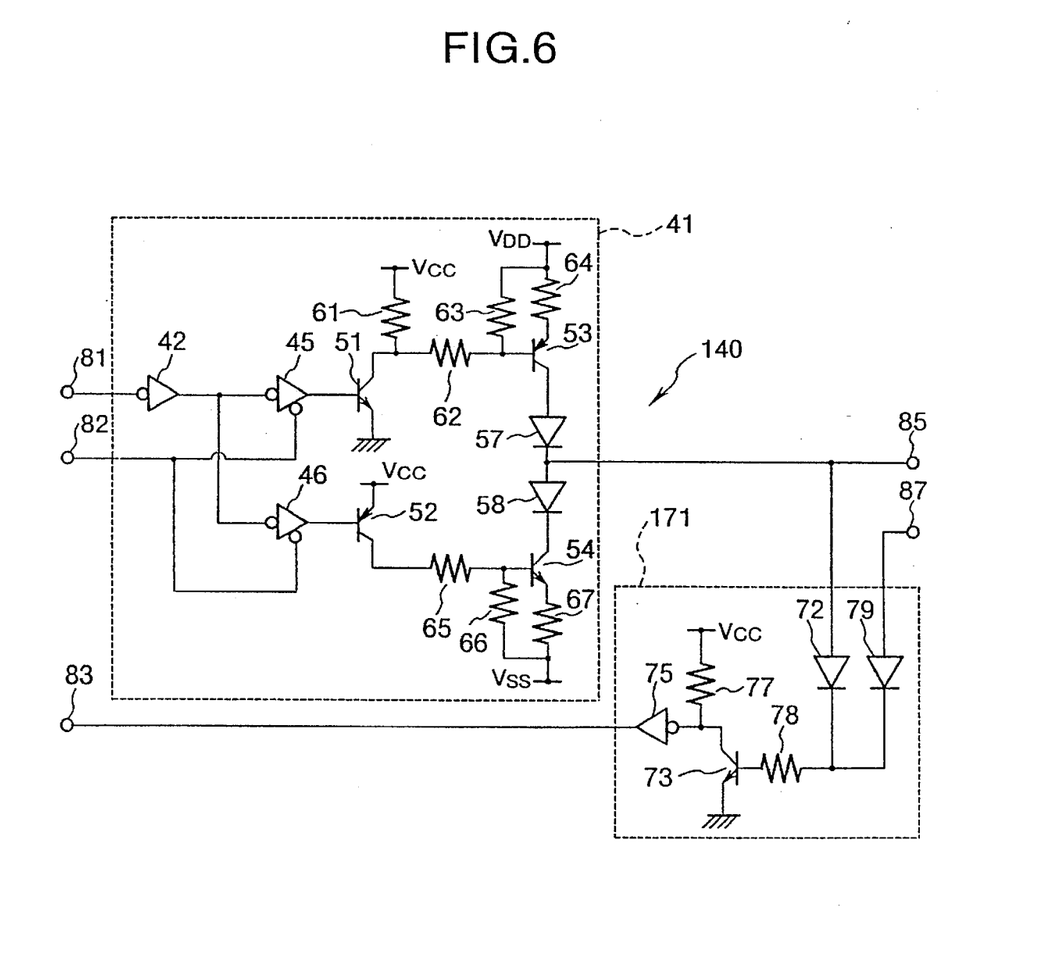
FIG. 6 is a diagram showing another circuit example of the two-way conversion adapter according to the present invention.

The circuitry of the two-way conversion adapter can be modified as shown in FIG. 6. An input buffer circuit 171 of an adapter 140 in FIG. 6 includes a diode 79 having an anode connected to an external data input terminal 87, and this diode 79 is provided in parallel to a diode 72.

Figure 7:
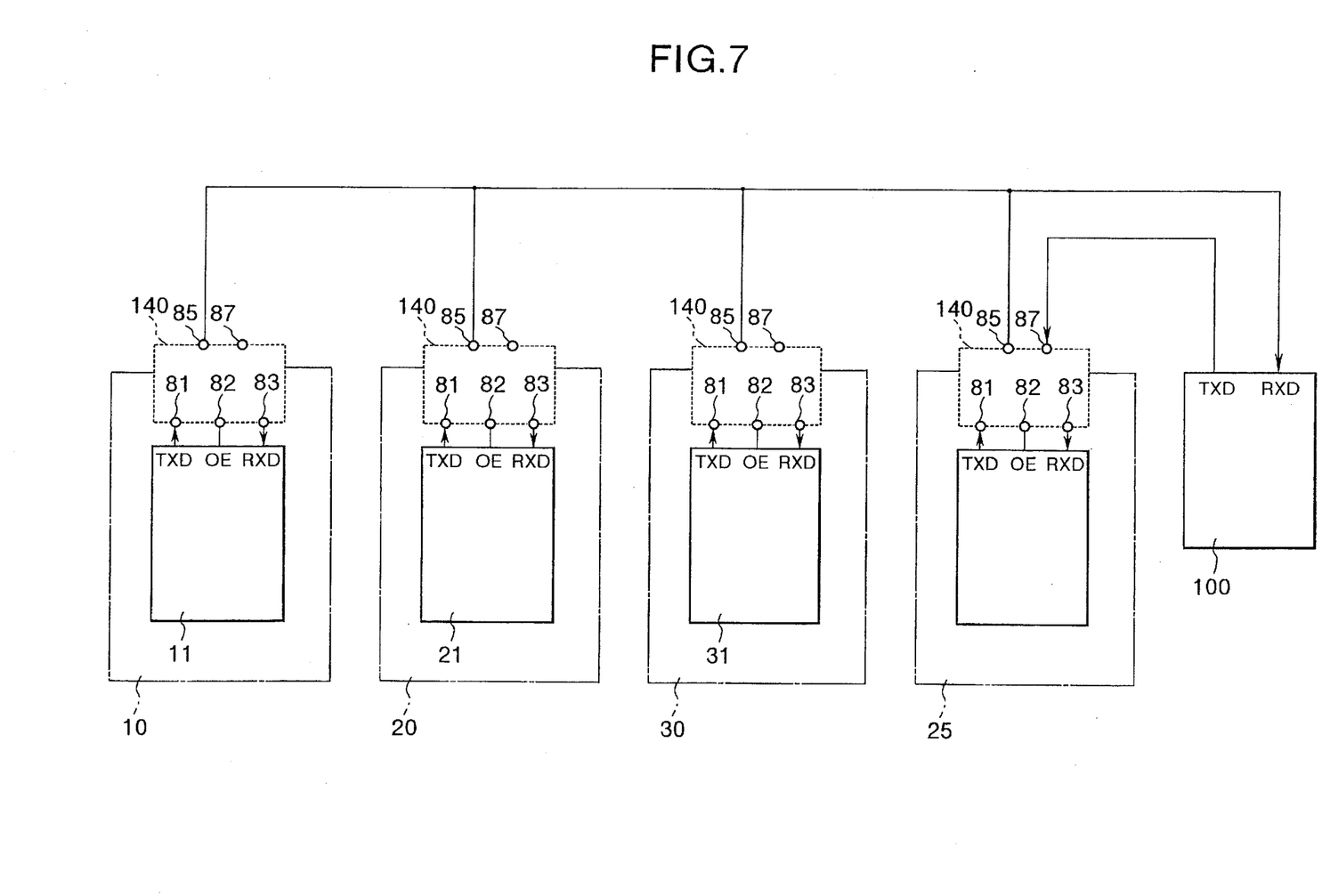
FIG. 7 is a diagram showing an example of the connection in a second embodiment of the two-way conversion adapter.

The controller including the adapter 140 according to this modified example is, as in the same way with the embodiment discussed above, connectable to a controller including an adapter 40 or 140 through the data I/O output terminal 85 and, at the same time, connectable to the conventional device 100 including no adapter as illustrated in FIG. 7. That is, the data I/O terminal 85 is connected to the data input terminal (RXD terminal) of the conventional device and used to output data to the conventional device. The output terminal (TXD terminal) of the conventional device is connected to the data input terminal 87 of the two-way conversion adapter 140 and used to output data to the adaptor 140.

What is claimed is:

1. A controller having a two-way serial communication function, comprising:

a central processing unit; and a serial communication device connected to said central processing unit, and including an interface having a serial data output port for outputting data transmitted from said central processing unit, and a serial data input port for inputting data transmitted to said central processing unit, said device further including an output buffer circuit, an input buffer circuit, and a data I/O terminal for transferring serial data to and from the outside;

said data I/O terminal being connected to said serial data output port via said output buffer circuit, and said data I/O terminal being connected to said serial data input port via said input buffer circuit, such that two-way serial data communication with said central processing unit can be conducted via said data I/O terminal and said serial data output and input ports.

2. A controller according to claim 1, wherein said serial communication device further has a serial data input terminal for receiving data from the outside, said serial data input terminal being connected to said serial data input port via said input buffer circuit to enable one-way serial data communication with said central processing unit in addition to said two-way serial data communication.

3. A controller according to claim 1, wherein said output buffer circuit transfers serial data to said data I/O terminal in response to a control signal from said central processing unit.

4. A controller according to claim 1, wherein said central processing unit has a discrimination program to enable said central processing unit to receive data via said input port in response to receipt of a specified identification code via said input port.

5. A controller having a central processing unit with a two-way serial communication function, comprising:

a serial port adapter including a serial data output port for outputting data transmitted from said central processing unit, a serial data input port for inputting data transmitted to said central processing unit, an output buffer circuit, an input buffer circuit, and a data I/O terminal for transferring serial data to and from the outside;

said data I/O terminal being connected to said serial data output port via said output buffer circuit, and said data I/O terminal being connected to said serial data input port via said input buffer circuit, such that two-way serial data communication with said central processing unit can be conducted via said data I/O terminal and said serial data output and input ports.

6. A controller according to claim 5, further comprising a discriminator to enable said central processing unit to receive data via said serial data input port in response to receipt of a specified identification code via said serial data input port.

7. A serial port adapter connected between a central processing unit and an external device to establish two-way serial communication between said central processing unit and said external device, comprising:

a data I/O terminal for inputting serial data from the external device and outputting serial data to the external device;

an output buffer circuit having a serial data input terminal and a control signal input terminal, both connected to said central processing unit, and a serial data output terminal connected to said data I/O terminal, said output buffer circuit transmitting serial data, inputted via said serial data input terminal, to said data I/O terminal in response to a data output control signal inputted via said control signal input terminal; and an input buffer circuit having a serial data input terminal connected to said data I/O terminal and a serial data output terminal connected to said central processing unit, said input buffer circuit also having a signal line for transmitting serial data, inputted via said data I/O terminal, to said serial data output terminal of said input buffer circuit.

8. An adapter according to claim 7, wherein said input buffer circuit has a second serial data input terminal for connection to an external device and a signal line for transmitting serial data inputted via said second serial data input terminal to said serial data output terminal of said input buffer circuit.

9. A serial port adapter connected to a central processing unit, comprising:

a data I/O terminal for outputting data from said central processing unit to an external device, and inputting data from said external device to said central processing unit;

a serial data output buffer circuit; and a serial data input buffer circuit;

said serial data output buffer circuit being connected to said central processing unit and said data I/O terminal for transferring data from said central processing unit to the external device as serial data via said data I/O terminal, and said serial data input buffer circuit being connected to said central processing unit and said data I/O terminal for transferring to said central processing unit data received from the external device as serial data via said data I/O terminal, such that two-way serial data communication between said central processing unit and the external device can be conducted via said data I/O terminal and said serial data output and input buffer circuits.

10. Apparatus comprising a plurality of operating units and a corresponding plurality of control units each controlling a respective operating unit, wherein each said control unit includes a central processing unit and a serial communication device connected to said central processing unit, said serial communication device comprising a serial data I/O terminal, a serial data output port for outputting data transmitted from said central processing unit, a serial data input port for inputting data transmitted to said central processing unit, an output buffer circuit connecting said serial data output port to said serial data I/O terminal, and an input buffer circuit connecting said serial data input port to said serial data I/O terminal, such that two-way serial communication with said central processing unit can be conducted via said serial data I/O terminal and said serial data output and input ports, and wherein the respective serial data I/O terminals of the serial communication devices of said plurality of control units are all connected to a single two-way serial data communication line.

11. Apparatus according to claim 10, wherein said output buffer circuit transfers serial data to said serial data I/O terminal in response to a control signal from said central processing unit.

12. Apparatus according to claim 10, wherein said central processing unit has a discrimination program to enable it to receive data via said serial data input port in response to receipt of a specified identification code via that input port.

13. Apparatus according to claim 10, further comprising an additional operating unit and a controller therefor, and wherein the serial communication device of one of said control units has a serial data input terminal connected to the serial data input port of that device via the input buffer circuit of that device and to said controller, to enable one-way serial data communication between said controller and said one control unit.

14. Apparatus according to claim 10, and which is constituted by a microscope system.

15. Apparatus according to claim 14, wherein said operating units include at least one of a revolver drive unit, a focusing unit, and a stage drive unit of said microscope system.

16. Apparatus comprising a plurality of operating units and a corresponding plurality of control units each controlling a respective operating unit, wherein each said control unit includes a central processing unit and a serial port adapter connected to said central processing unit, said serial port adapter comprising a serial data I/I/O terminal, a serial data output buffer circuit connecting serial data I/O terminal to said central processing unit for transferring data transmitted from said central processing unit, and a serial data input buffer circuit connecting said serial data I/O terminal to said central processing unit for transferring data transmitted to said central processing unit, such that two-way serial communication with said central processing unit can be conducted via said serial data I/O terminal and said serial data output and input buffer circuits, and wherein the respective serial data I/I/O terminals of the serial port adapters of said plurality of control units are all connected to a single two-way serial data communication line.

17. Apparatus according to claim 16, wherein said output buffer circuit has a control signal input terminal connected to said central processing unit, and said output buffer circuit transfers data transmitted from said central processing unit, in response to a control signal received via said control signal input terminal.

18. Apparatus according to claim 16, wherein said central processing unit has a discrimination program to enable it to receive data via said input buffer circuit in response to receipt of a specified identification code via that circuit.

19. Apparatus according to claim 16, further comprising an additional operating unit and a controller therefor, and wherein the serial port adapter of one of said control units has a serial data input terminal connected to the input buffer circuit of that adapter and to said controller, to enable one-way serial data communication between said controller and said one control unit.

20. Apparatus according to claim 16, and which is constituted by a microscope system.

21. Apparatus according to claim 20, wherein said operating units include at least one of a revolver drive unit, a focusing unit, and a stage drive unit of said microscope system.

* * * * *